US 8,123,175 B2
Feb. 28, 2012

(12) United States Patent
Mak

(10) Patent No.: US 8,123,175 B2
(45) Date of Patent: Feb. 28, 2012

(54) VELOCITY FEEDBACK CONTROL SYSTEM FOR A ROTOR OF A TOY HELICOPTER

(75) Inventor: Paul Mak, Kowloon (CN)

(73) Assignee: Spin Master Ltd., Toronto, Ontario (CA)

( * ) Notice: Subject to any disclaimer, the term of this patent is extended or adjusted under 35 U.S.C. 154(b) by 3 days.

(21) Appl. No.: 12/647,129

(22) Filed: Dec. 24, 2009

(65) Prior Publication Data

US 2011/0155842 A1 Jun. 30, 2011

(51) Int. Cl.
*G05D 1/00* (2006.01)
*B64C 27/00* (2006.01)

(52) U.S. Cl. .................. 244/194; 244/17.11; 244/17.13

(58) Field of Classification Search ............... 244/17.11, 244/17.19, 17.21, 17.23, 17.13, 189, 190, 244/194; 73/66, 455, 460, 462, 464; 701/7, 701/8; 340/946, 967, 969, 974, 975; 700/729, 700/280, 63, 64, 69, 188; 356/27, 28, 285; 416/1, 25, 27, 30, 33, 35, 36, 43, 44, 47, 416/124, 126, 127, 128, 129, 130

See application file for complete search history.

(56) References Cited

U.S. PATENT DOCUMENTS

| 3,722,830 | A |   | 3/1973  | Barber |        |
|-----------|---|---|---------|--------|--------|
| 4,071,811 | A | * | 1/1978  | Irwin  | 318/16 |
| 4,531,692 | A |   | 7/1985  | Mateus |        |
| 5,058,824 | A |   | 10/1991 | Cycon et al. | |
| 5,148,402 | A |   | 9/1992  | Magliozzi et al. | |
| 5,179,526 | A |   | 1/1993  | Zimmer et al. | |
| 5,214,596 | A |   | 5/1993  | Müller |        |
| 5,672,086 | A |   | 9/1997  | Dixon  |        |
| 5,746,390 | A |   | 5/1998  | Chiappetta | |
| 5,951,608 | A | * | 9/1999  | Osder  | 701/11 |
| 6,089,501 | A |   | 7/2000  | Frost  |        |
| 6,293,492 | B1 |  | 9/2001  | Yanagisawa | |
| 6,343,768 | B1 |  | 2/2002  | Muldoon |       |
| 6,879,885 | B2 | * | 4/2005  | Driscoll et al. | 701/3 |
| 7,448,571 | B1 |  | 11/2008 | Carter |        |
| 7,448,854 | B2 | * | 11/2008 | Jolly et al. | 416/1 |
| 7,497,759 | B1 | * | 3/2009  | Davis  | 446/454 |
| 7,662,013 | B2 |  | 2/2010  | Van de Rostyne et al. | |
| 7,789,341 | B2 |  | 9/2010  | Arlton |        |
| 2003/0040247 | A1 | | 2/2003 | Rehkemper et al. | |
| 2005/0061909 | A1 | * | 3/2005 | Winston | 244/17.19 |
| 2006/0011777 | A1 | * | 1/2006 | Arlton et al. | 244/7 B |

(Continued)

FOREIGN PATENT DOCUMENTS

WO  WO 92/02413 A1  7/1991

(Continued)

OTHER PUBLICATIONS http://en.wikipedia.org/wiki/Pulse-width_modulation.*

(Continued)

*Primary Examiner* — Joshua J Michener
(74) *Attorney, Agent, or Firm* — Cozen O'Connor

(57) ABSTRACT

There is provided a method and apparatus for controlling a toy helicopter in flight. The toy helicopter is powered by a first rotor and a second rotor. A target speed ratio is determined for the speed of the first rotor and the speed of the second rotor. The speed of the rotors is adjusted incrementally until the target ratio is achieved.

13 Claims, 4 Drawing Sheets

U.S. PATENT DOCUMENTS

| | | |
|---|---|---|
| 2006/0121819 A1 | 6/2006 | Isawa |
| 2006/0231677 A1 | 10/2006 | Zimet et al. |
| 2006/0253230 A1 | 11/2006 | Fanciullo et al. |
| 2007/0105475 A1 | 5/2007 | Gotou |
| 2008/0112808 A1 | 5/2008 | Schmaling et al. |
| 2008/0220687 A1 | 9/2008 | Taya |
| 2008/0294305 A1 | 11/2008 | Roesch |
| 2008/0299867 A1 | 12/2008 | Van de Rostyne |
| 2008/0308682 A1 | 12/2008 | Builta et al. |
| 2009/0057482 A1 | 3/2009 | Lin |
| 2009/0117812 A1 | 5/2009 | Van de Rostyne et al. |
| 2009/0129929 A1 | 5/2009 | Bahadir |
| 2009/0159740 A1 | 6/2009 | Brody et al. |
| 2009/0171516 A1 | 7/2009 | Reich |
| 2009/0216392 A1 | 8/2009 | Piasecki et al. |
| 2009/0242691 A1 | 10/2009 | Wittmer |
| 2009/0321554 A1 | 12/2009 | Roesch |
| 2010/0003886 A1 | 1/2010 | Cheng |
| 2010/0044499 A1 | 2/2010 | Dragan |
| 2010/0047067 A1 | 2/2010 | Houser et al. |

FOREIGN PATENT DOCUMENTS

| | | |
|---|---|---|
| WO | WO 2008/086643 A1 | 1/2007 |
| WO | WO 2008/086643 A1 | 7/2008 |

OTHER PUBLICATIONS

FS8 Copilot, FMA company.*

Pegasus 35, Castle Creations.*

Sheng, Shou-Zhao; Dual Engine Control Strategy for an Unmanned Helicopter; Jan. 1, 2010; College of Automation Engineering, Nanjing University of Aeronautics and Astronautics, Nanjing, China; 1 page.

RCHelicopter.com; Introduction to Coaxial RC Helicopters; 2008; http://www.rchelicopter.com/2008/04/18/Introduction-to-coaxial-rc-helicopters/;5 pages.

* cited by examiner

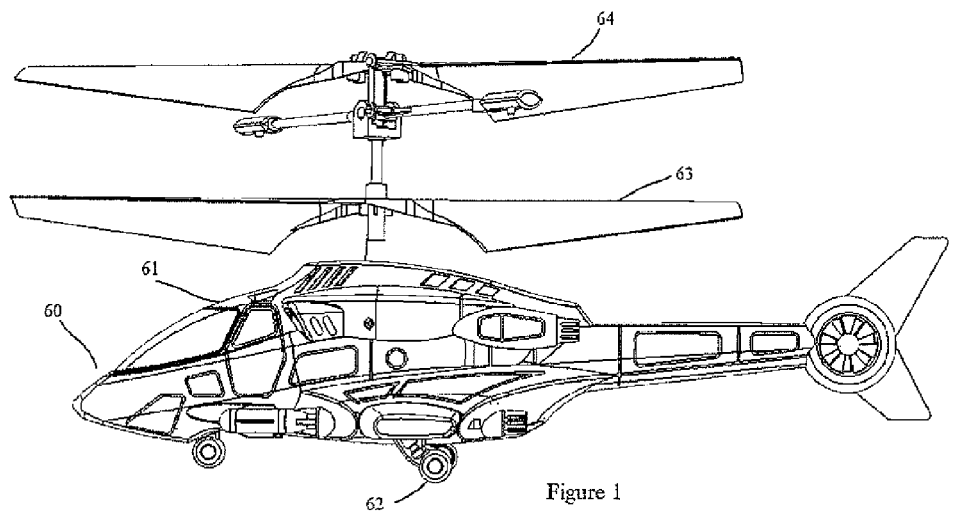
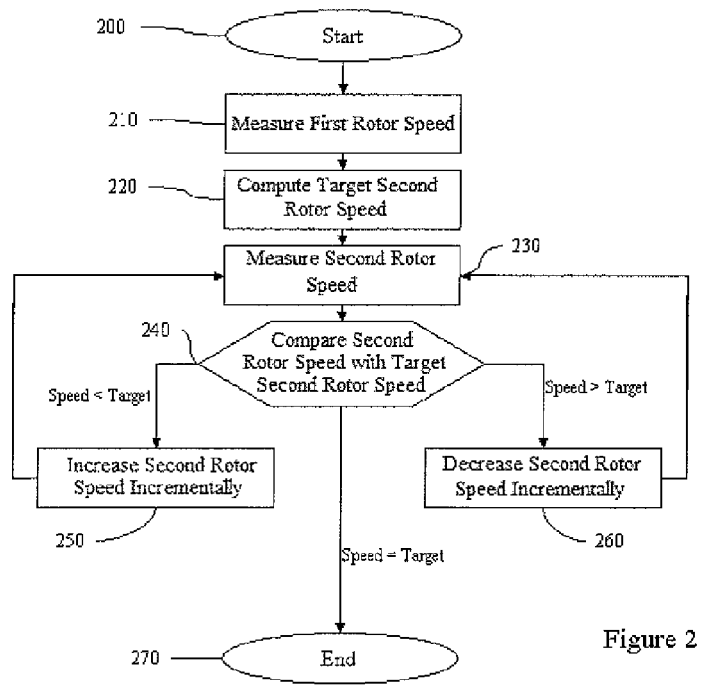
Figure 1
Figure 2

VELOCITY FEEDBACK CONTROL SYSTEM FOR A ROTOR OF A TOY HELICOPTER

FIELD OF THE INVENTION

The present invention relates to toy helicopters. In particular, the present invention relates to a method and device for improving the controllability and stability of toy helicopters.

BACKGROUND OF THE INVENTION

Toy helicopters, just like real helicopters, get lift from a rotor, spinning in a horizontal plane above the helicopter's main body. However, the spinning of the rotor causes torque to be applied on the helicopter, which makes it very difficult to maintain the helicopter in a forward-facing position.

Some helicopters solve this problem by having two coaxial rotors, each spinning in a direction opposite that of the other. As each of the two rotors creates a torque which counteract each other, the helicopter remains stable.

Another way to counteract the torque produced by the rotor is to add a tail rotor, which spins in a vertical plane. The force produced by such a tail rotor is designed to be in an opposite direction to the torque produced by the horizontal rotor, such that the helicopter remains stable.

However, as will be appreciated by people skilled in the art, the above solution requires that the rotors be precisely calibrated, since if too much or too little power is given to one of the rotors, the helicopter will be difficult to maneuver. In toy helicopters, this particularly creates problems in two situations: (1) when the helicopter's battery loses power, and (2) when the power to the rotor is increased or decreased suddenly.

Therefore, the present device and method provide a solution to the above problem. Specifically, the present device and method use software to ensure the amount of power provided to a second rotor is calibrated precisely to counteract the torque created by a first rotor.

There is further provided a device and method to precisely set the speed of a rotor according to a throttle position.

There is further provided a device and method to steer a toy helicopter by adjusting the power level of a first rotor and a second rotor.

SUMMARY OF THE INVENTION

The present device and method provide greater stability and maneuverability to a toy helicopter by ensuring that the amount of power provided to the rotors will produce the correct amount of torque according to user commands.

According to at least one embodiment of the present invention, there is provided a method for controlling a helicopter, the helicopter having a plurality of rotors, each rotor having a rotor speed and a target rotor speed, the method comprising the steps of (a) measuring the rotor speed of at least one of the plurality of rotors; (b) if the rotor speed of the at least one of the plurality of rotors is greater than the target rotor speed for the at least one of the plurality of rotors, decreasing the power to the at least one of the plurality of rotors by a fixed increment; (c) if the rotor speed of the at least one of the plurality of rotors is less than the target rotor speed for the at least one of the plurality of rotors, increasing the power to the at least one of the plurality of rotors by a fixed increment; and (d) repeating steps (a) to (c) until the rotor speed of the at least one of the plurality of rotors and the target rotor speed for the at least one of the plurality of rotors are within a predetermined margin.

According to at least one embodiment of the present invention, there is provided a method for controlling a helicopter, the helicopter having a first rotor and a second rotor, the method comprising the steps of: (a) measuring the speed of the first rotor; (b) determining the target second rotor speed based on the speed of the first rotor; (c) measuring the speed of the second rotor; (d) if the speed of the second rotor is greater than the target second rotor speed, decreasing the power to the second rotor by a fixed increment; (e) if the speed of the second rotor is less than the target second rotor speed, increasing the power to the second rotor by a fixed increment; and (f) repeating steps (c) to (e) until the speed of the second rotor and the target second rotor speed are within a predetermined margin.

According to at least one embodiment of the present invention, there is provided a method for controlling a helicopter, the helicopter having a rotor, the method comprising the steps of: (a) reading a throttle position; (b) determining the target rotor speed based on the throttle position; (c) measuring the speed of the rotor; (d) if the speed of the rotor is greater than the target rotor speed, decreasing the power to the rotor by a fixed increment; (e) if the speed of the rotor is less than the target rotor speed, increasing the power to the rotor by a fixed increment; and (f) repeating steps (c) to (e) until the speed of the rotor and the target rotor speed are within a predetermined margin.

According to at least one embodiment of the present invention, there is provided a method of steering a helicopter, the helicopter having a first rotor and a second rotor, the method comprising the steps of (a) reading a steering position; (b) measuring a first rotor speed; (c) determining a target second rotor speed based on the first rotor speed and the steering position; (d) measuring the second rotor speed; (e) if the second rotor speed is greater than the target second rotor speed, decreasing the power to the second rotor by a fixed increment; (f) if the second rotor speed is less than the target second rotor speed, increasing the power to the second rotor by a fixed increment; and (g) repeating steps (d) to (f) until the second rotor speed and the target second rotor speed are within a predetermined margin.

According to at least one embodiment of the present invention, there is provided a method for controlling a helicopter, the helicopter having a first rotor and a second rotor, the first rotor having a first rotor speed and the second rotor having a second rotor speed, the first rotor speed and the second rotor speed being adjusted such that the helicopter is stable in flight, the ratio of the adjusted first rotor speed to the adjusted second rotor speed defining a target ratio; the method comprising the steps of: (a) measuring the ratio of the first rotor speed to the second rotor speed; (b) if the ratio is greater than the target ratio, performing at least one of decreasing the power to the first rotor by a fixed increment and increasing the power to the second rotor by a fixed increment; (c) if the ratio is less than the target ratio, performing at least one of increasing the power to the first rotor by a fixed increment and decreasing the power to the second rotor by a fixed increment; and (d) repeating steps (a) to (c) until the ratio and the target ratio are within a predetermined margin.

According to at least another embodiment of the present invention, there is provided a helicopter comprising: a first rotor powered by a first motor; a second rotor powered by a second motor; a power source to provide power to the first rotor and the second rotor; and a microprocessor configured to perform any of the above methods.

BRIEF DESCRIPTION OF THE DRAWINGS

FIG. 1 is a side view of a helicopter according to one embodiment of the present invention.

FIG. 2 is a flow chart of a method according to one embodiment of the present invention.

DETAILED DESCRIPTION

Figure 3A:
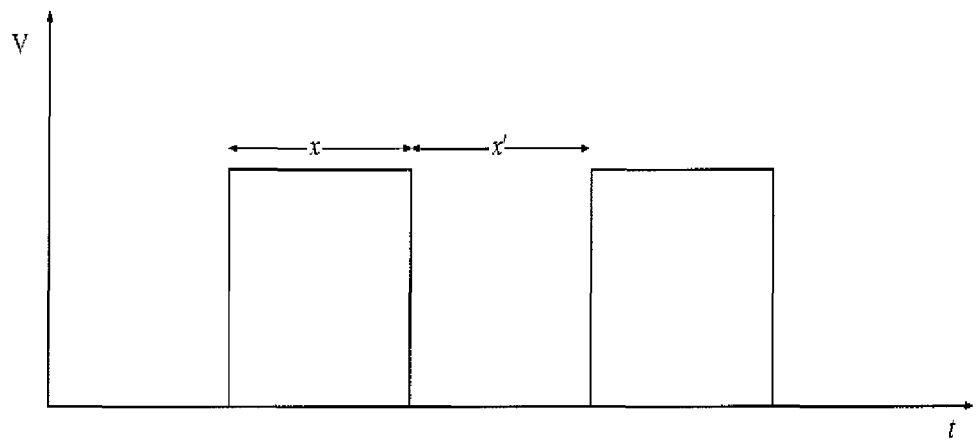
FIG. 3a shows a symbolic representation of power delivered to a motor using pulse width modulation.

Reference is made to FIG. 1. FIG. 1 shows a helicopter 60 having a cockpit 61, landing gear 62, a first rotor 63 and a second rotor 64. It also includes a first motor (not shown) to drive the first rotor 63, a second motor (not shown) to drive the second rotor 64, and a power source (not shown) to power both motors. A microprocessor (not shown) controls the level of power provided to each motor. As the first and second motors receive power, rotors 63 and 64 rotate at a speed which depends on the level of power received.

Figure 3B:
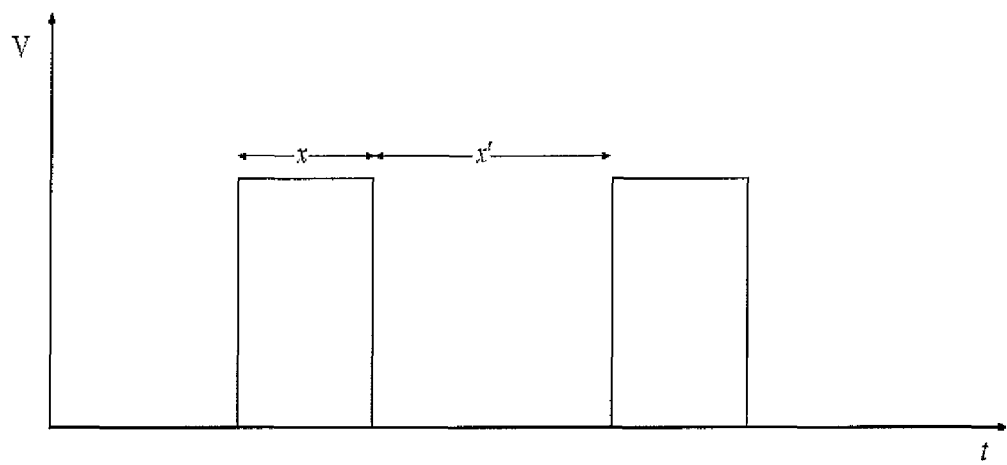
FIG. 3b shows a symbolic representation of power delivered to a motor using pulse width modulation.

In at least one embodiment, the power that drives the motors is adjusted using Pulse Width Modulation (PWM). Reference is now made to FIGS. 3a and 3b, which illustrate how PWM is used to provide different amounts of power.

FIG. 3a shows a graph where voltage (V) is plotted against time (t). Power is provided for a period x and then turned off for a period x'. In this example, the periods x and x' are essentially equal, and therefore power is provided, on average, for half of the time.

FIG. 3b shows another graph where voltage (V) is plotted against time (t). In this example however, the period x during which power is provided has been reduced in relation to the period x' during which power is turned off, and power is provided, on average, for a third of the time.

Thus the graphs of FIG. 3a and FIG. 3b show how PWM can be used to adjust very finely the amount of power provided to an electric motor. As will be understood by those skilled in the art, what is most important in PWM is not the specific periods x and x' but rather the proportion of x in relation to x'.

Therefore, in the at least one embodiment wherein power is adjusted using PWM, the power level could be one of N power levels. Although those skilled in the art could readily understand how this can be done, the following example is provided for illustrative purposes.

The period T is defined as follows:

$$T = x + x' \quad \text{Equation 1}$$

If there are N power levels, each separated by an increment of λ, the increment λ must be computed by the following equation:

$$\lambda = \frac{T}{N-1} \quad \text{Equation 2}$$

The values for x and x' for a power level i, where i is between 0 and (N−1) are computed as follows:

$$x = i\lambda \quad \text{Equation 3}$$

$$x' = [N-(i+1)]\lambda \quad \text{Equation 4}$$

Thus, for 16 power levels (N=16) and a period T=30 milliseconds, the values of x and x' for a given power level i are computed as per the table below.

| i | x | x' |
|---|---|----|
| 0 | 0 | 30 |
| 1 | 2 | 28 |
| 2 | 4 | 26 |
| 3 | 6 | 24 |
| 4 | 8 | 22 |
| 5 | 10 | 20 |
| 6 | 12 | 18 |
| 7 | 14 | 16 |
| 8 | 16 | 14 |
| 9 | 18 | 12 |
| 10 | 20 | 10 |
| 11 | 22 | 8 |
| 12 | 24 | 6 |
| 13 | 26 | 4 |
| 14 | 28 | 2 |
| 15 | 30 | 0 |

It will be appreciated however, that the above example is provided for illustrative purposes only and is not limiting.

It will also be appreciated by those skilled in the art that in at least some embodiments, a motor may require at least a certain threshold of power before operating, such that, for example, the minimum pulse width required is achieved when i has a value n which is greater than 1 but less than N. The specific value n will depend on the particular characteristics of the motor and can be readily determined by the skilled person. In such a case, the above table may be adjusted so that power levels corresponding to i=1 . . . n would be discarded.

In at least one embodiment, the power is provided to the first motor and the second motor using PWM as shown in the example above. In such an embodiment, the step of adjusting the power to the second motor incrementally is performed by increasing or decreasing the variable i by 1, and recalculating the values of x and x' accordingly.

As will be appreciated by those skilled in the art, using PWM also allows measurement of the rotational speed of a rotor by measuring the feedback voltage of the motor which drives the rotor. When no power is provided to the motor (i.e., during the period corresponding to x' in FIGS. 3a and 3b), the motor acts like a generator and generates a feedback voltage dependent upon the rotation speed of the associated rotor, making it possible to use the feedback voltage produced by the motor as a proxy for the speed of the rotor driven by the motor.

The power received by the first and second motors, and therefore, the rotational speed of the rotors powered by the first and second motors, is monitored, according to at least one embodiment, by measuring the feedback voltage produced by the motors. In particular, in at least one embodiment, the feedback voltage of the first motor is measured as a proxy for the rotational speed of the first rotor, and the measurement is used to determine what the rotational speed of the second rotor, and the feedback voltage of the second motor, should be to achieve stability.

In at least one embodiment, the feedback voltage of the motors is measured by a circuit or a microprocessor.

The relationship between the first motor feedback voltage and the second motor feedback voltage required to achieve a stable flight depends on a number of factors, including but not limited to, the number of blades on each rotor and the dimension of these blades. Therefore, there is no unique rule which is applicable to each helicopter, however, it is within the purview of a person skilled in the art to determine that relationship by simple experimentation.

Based on the relationship between the first motor feedback voltage and the target second motor feedback voltage, the target second motor feedback voltage is computed and compared to the measured second motor feedback voltage. It will be appreciated by those skilled in the art that these steps are preferably performed by a microprocessor running software.

If the measured second motor feedback voltage is equal to, or within an acceptable margin of error of, the target second motor feedback voltage, the method ends and is repeated when new measurements are performed. On the other hand, if the values diverge by more than an acceptable margin, the power to the second rotor is adjusted incrementally.

Reference is now made to FIG. 2 which shows a flow diagram of the method according to at least one embodiment of the present invention.

The method starts at step 210 where the first rotor's speed is measured. As will be appreciated by those skilled in the art, it is not necessary that the actual rotational speed of the rotor be measured. As per the above, the speed may be measured using a proxy value such as the motor's feedback voltage.

At step 220, the first rotor's speed measured in step 210 is used to compute the target second rotor speed. As with step 210, in some embodiments, it may be simpler to compute a target proxy value such as a target feedback voltage for the second motor. The relationship between the first rotor's speed and the target second rotor speed is typically determined by experimentation. In some embodiments, the target second rotor speed may be computed as the first rotor's speed multiplied by a factor α, as in the equation below, where $S_{target}$ is the target second rotor speed and $S_{first}$ is the first rotor speed.

$$S_{target} = S_{first} \times \alpha \qquad \text{Equation 5}$$

It will be appreciated by one of skill in the art that other mathematical relationships of varying complexity can exist between the speed of the first rotor and the target speed of the second rotor and that it is within the ability of the skilled person to determine such mathematical relationships.

In another embodiment, a look-up table can be created and stored in memory, where the first rotor speed is used as an index to find a target second rotor speed.

It should be appreciated by those skilled in the art that the above examples are provided for illustrative purposes only and are not intended to be limiting.

At step 230, the actual second rotor speed is measured, and at step 240 the second rotor speed is compared to the target second rotor speed. It will be appreciated by those skilled in the art that for the comparison to be meaningful, both values should be in the same units. Therefore, if the actual speed is measured in revolutions per minute (RPM), the target second rotor speed should also be in revolutions per minute. Similarly, if the measured speed is measured as a feedback voltage, the target speed should also be expressed as a feedback voltage.

If, at step 240, it is found that the actual speed is less than the target speed, the second rotor speed is increased incrementally, using PWM as discussed above or by other means known in the art. Similarly, if the actual speed is more than the target speed, the second rotor speed is decreased incrementally, using PWM as discussed above or by other means known in the art. In both cases, the method returns to step 230 where the actual speed is measured once again.

If however the actual speed is equal to the target speed, or if the two speeds are within an acceptable margin of error of each other, the method ends at step 270. What is an acceptable margin of error will depend on a host of factors, however it is within the purview of the skilled person to determine that experimentally.

The skilled person will appreciate that it is possible to adjust the speed of either rotor or of both rotors simultaneously, by adjusting the power to the respective motors, in order to maintain the rotor speeds within the desired mathematical relationship. For example, if the second rotor speed is higher than is required to maintain the required mathematical relationship with the first rotor speed, either the power can be decreased to the second motor, or the power can be increased to the first motor, or the power of both motors can be adjusted simultaneously, until the second rotor speed and first rotor speed achieve the desired relationship.

The present method and device also provide for setting the rotor speed according to a user-controlled throttle, such as, for example, on a remote control device which is used to control the helicopter's flight. As is known in the art, the throttle controls the amount of power delivered to the helicopter's rotor.

The present method can be used to ensure that the actual power delivered to a first rotor is appropriate based on the throttle position, and to adjust a second rotor's power accordingly. Such a method is shown in FIG. 4.

Figure 4:
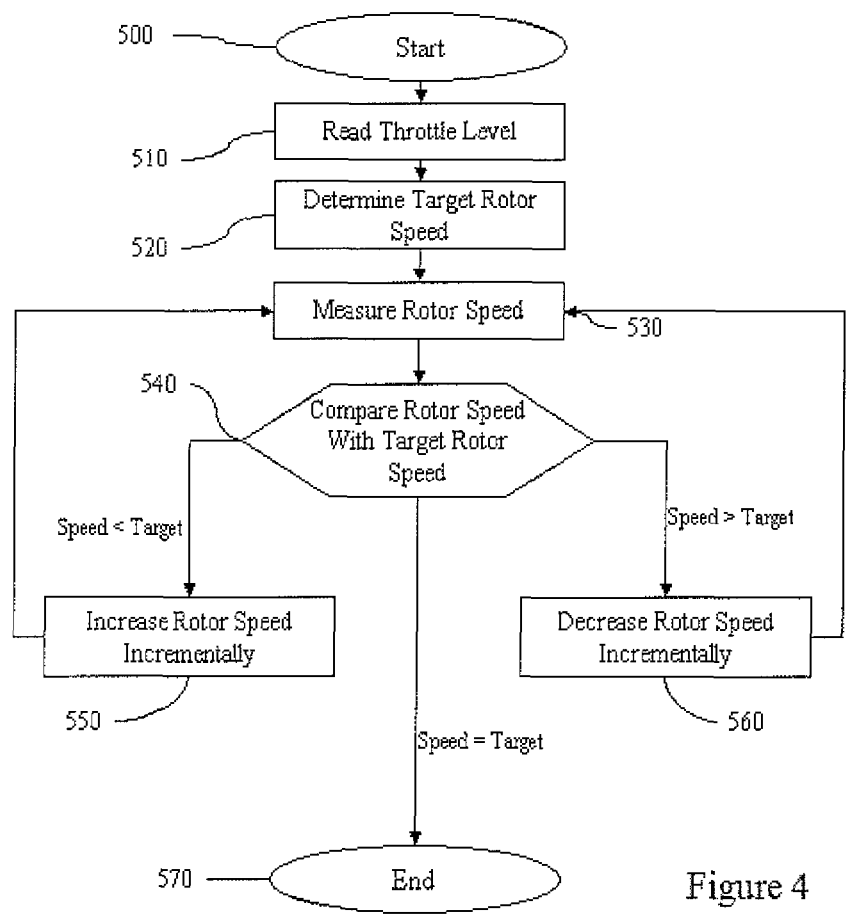
FIG. 4 is a flow chart of a method according to one embodiment of the present invention.

As shown in FIG. 4, the method starts at step 510 where the throttle position is determined. This step may be performed by the processor inside the helicopter, and could consist of receiving a command from the remote control device notifying the helicopter that the throttle has been moved to a new level. Other means of performing this step may be known in the art and the above is not intended to be limiting.

At step 520, the throttle level is used to determine the target rotor speed. As will be appreciated by those skilled in the art, the relationship between the throttle level and the rotor speed is readily established.

At step 530, the rotor speed is measured. As in the case of the method shown in FIG. 2, measuring the rotor speed may consist in measuring a proxy value, like the motor's feedback voltage.

At step 540, the rotor speed is compared to the target rotor speed. If the actual speed is less than the target speed, the rotor speed is increased incrementally at step 550. If the actual speed is more than the target speed, the rotor speed is decreased incrementally at step 560. In at least one embodiment, the rotor speed is increased or decreased by adjusting the parameters of PWM.

If the actual speed is equal to the target speed, or if the actual speed and the target speed are within an acceptable margin of each other, the method ends at step 570. The method is repeated the next time the throttle is moved to a new level.

It will be appreciated by those skilled in the art that the methods of FIG. 4 and of FIG. 2 may be combined, so that as a first rotor's speed is adjusted to correspond to the throttle position, the second rotor's speed is adjusted to provide a stable flight at the first rotor's adjusted speed. In at least one embodiment of this combined method, the method of FIG. 2 is performed every time the method of FIG. 4 increases or decreases the first rotor's speed.

The skilled person will appreciate that in at least one embodiment, the method according to the present invention can involve adjusting the ratio between the speeds of the first rotor and the second rotor. It is therefore contemplated that the speeds of both the first rotor and second rotor can be modified simultaneously so as to adjust this ratio, for example, by using PWM as described above. For example, the ratio of the first rotor speed to the second rotor speed is too high, the helicopter can be controlled by simultaneously and incrementally increasing the power to the second rotor and decreasing the power to the first rotor until the desired ratio of the first rotor speed to the second rotor speed has been established. Conversely, if the ratio of the first rotor speed to the second rotor speed is too low, the helicopter can be controlled by simultaneously and incrementally increasing the power to the first rotor and decreasing the power to the second rotor until the desired ratio of the first rotor speed to the second rotor speed has been achieved.

In at least one embodiment, the present method may be used on a helicopter with first and second rotors being co-axial rotors, as shown in FIG. 1. In at least one embodiment, the present method may also be used on a helicopter with first and second rotors being a main horizontal rotor and a tail rotor. In at least one embodiment, the first rotor is a main horizontal rotor and the second rotor is a tail rotor.

Typically, a helicopter with two coaxial rotors will be stable (i.e., the torque produced by both rotors will counter-balance each other) if both rotors are of the same dimensions and they rotate at the same speed in opposite directions. In such a case, the present method could be used to ensure that the speed of both rotors is the same. For example, the present method could be implemented with $\alpha=1$ (as in Equation 5 above).

In some cases however, the desired ratio between the speed of both rotors may not be 1, for example if the dimensions of the rotors are different from each other.

In at least one embodiment, the present method may also be used for performing yawing motions, either on a helicopter with co-axial rotors or on a helicopter with a tail rotor. In particular, this can be done by adjusting the relationship between the first rotor speed and the target second rotor speed.

As will be appreciated by those skilled in the art, in the above examples, the method's objective is to cancel out the torque from the first rotor with the torque from a second rotor, so that the helicopter could fly in a straight line. If however it is desired, not to fly in a straight line, but to perform yawing motions, the torque of either motor can be harnessed to that effect.

Steering of a helicopter can be controlled by a remote control device which includes a left and right steering control. It will be appreciated by those skilled in the art, that when the steering control is in a neutral position, the present method should be performed as described above. When the steering control is moved in a position indicating that the helicopter should steer left or right, the present method should be performed to ensure the ratio between the first rotor speed and the second rotor speed creates a net torque which directs the helicopter's flight according to the steering control's position.

In at least one embodiment, the steering control has 7 discrete positions. Each position corresponds to a relationship between the speed of the first rotor and the second rotor. The following table is provided to illustrate how this can be achieved, however, it is not intended to be limiting.

| Steering position | $\alpha$ |
|---|---|
| Neutral | 1 |
| Left-1 | 0.9 |
| Left-2 | 0.8 |
| Left-3 | 0.7 |
| Right-1 | 1.1 |
| Right-2 | 1.2 |
| Right-3 | 1.3 |

In the above table, the neutral position corresponds to an $\alpha$ value of 1, meaning that for the helicopter to travel in a straight line, both the first rotor and second rotor should rotate at the same speed. The steering position Left-1 means that the helicopter should be turning slightly left, and therefore the $\alpha$ value is 0.9, which means that the second rotor speed should be 90% of the first rotor's speed. As would be appreciated by those skilled in the art, this implies that the resulting torque when the second rotor rotates at 90% of the first rotor's speed makes the helicopter turn left.

Similarly, the steering position Left-2 corresponds to a more pronounced steering to the left and this is achieved by having the second rotor speed at 80% of the first rotor's speed, or an $\alpha$ of 0.8.

As will be appreciated by those skilled in the art, the relationship between the steering position, the first rotor speed, and the second rotor speed may not be as simple as depicted above. In particular it may not necessarily be expressed in terms of a single factor $\alpha$. The applicable values for a given helicopter may be readily determined experimentally by the person of skill in the art, and in the case when no clear mathematical relationship between these values can be established, a lookup table might be the most efficient way of computing the correct values.

In at least one embodiment, the remote control of the helicopter further includes a trim knob. In this embodiment, the trim knob is used to adjust the relationship between the speeds of each rotor. Therefore, once the helicopter is flying, the user can adjust the trim knob until the helicopter's flight is stable. In particular, as the trim knob is adjusted, one rotor's speed is increased by an increment and the other rotor's speed is decreased by the same increment, thereby maintaining a constant thrust acting on the helicopter. The ratio between the two rotor speeds following an adjustment of the trim knob is then stored as a target ratio and maintained, using the methods described above, until the trim knob is adjusted again. The skilled person will appreciate that, while a trim knob is specifically described, any means of controlling the trim is contemplated as forming part of the present invention.

Figure 5:
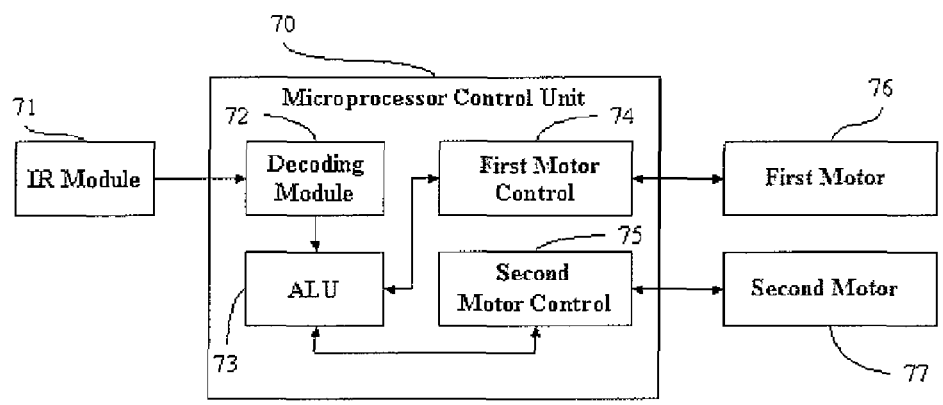
FIG. 5 is a block diagram of the electronic components of a helicopter according to one embodiment of the present invention.

Reference is now made to FIG. 5, which shows a block diagram of the helicopter's internal circuitry according to at least one embodiment.

The microprocessor control unit (MCU) 70 is shown as having a decoding module 72, an arithmetic and logic unit (ALU) 73, a first motor control 74, and a second motor control 75. It will be appreciated by those skilled in the art that the ALU 73 is an important hardware component of microprocessors which is used to perform arithmetic and logical operations. The decoding module 72, the first motor control 74 and the second motor control 75 can be implemented as software modules or as individual circuits, as is known in the art. Also shown in FIG. 5 are the infrared (IR) module 71, the first motor 76 and the second motor 77.

During operation, the IR module 71 receives commands from a remote control device (not shown). These commands are decoded by the decoding module 72, processed by the ALU 73, where the commands are interpreted and the desired speed for both the first rotor and second motor are computed according to the present disclosure.

The ALU then notifies the first motor control 74 of the desired speed. The first motor control 74 adjusts the first motor 76's speed as described above and receives feedback voltage information from the first motor 76.

Based on the feedback information received from the first motor 76, the ALU also notifies the second motor control 75 of the desired speed for the second motor. The second motor control then adjusts the second motor 77's speed as described above and receives feedback voltage information from the second motor 77.

The embodiments of the present invention described herein are intended to be non-limiting. Various modifications which are readily apparent to the person of skill in the art are intended to be within the scope of the invention, the only limitations to which are set forth in the appended claims.

I claim:

1. A method for controlling a helicopter, the helicopter having a first rotor and a second rotor, the method comprising the steps of:
   (a) measuring a speed of the first rotor;
   (b) determining a target second rotor speed based on the speed of the first rotor;
   (c) measuring a speed of the second rotor;
   (d) if the speed of the second rotor is greater than the target second rotor speed, decreasing power to the second rotor by a fixed increment;
   (e) if the speed of the second rotor is less than the target second rotor speed, increasing power to the second rotor by a fixed increment;
   (f) repeating steps (c), (d) and (e), until the speed of the second rotor and the target second rotor speed are within a predetermined margin,
   wherein the first rotor is driven by a first motor, and the second rotor is driven by a second motor, and wherein power is provided to the first motor and the second motor using pulse width modulation (PWM),
   wherein the step of measuring the speed of the first rotor comprises measuring the feedback voltage of the first motor, and
   wherein the step of measuring the speed of the second rotor comprises measuring the feedback voltage of the second motor.

2. The method according to claim 1, wherein the second rotor is a tail rotor.

3. The method according to claim 1, wherein the second rotor is coaxial with the first rotor.

4. The method according to claim 1, wherein the step of determining the target second rotor speed depends on a trim position.

5. A method for controlling a toy helicopter, the helicopter having a rotor, the method comprising the steps of:
   (a) reading a throttle position;
   (b) determining a target rotor speed based on the throttle position;
   (c) measuring a speed of the rotor;
   (d) if the speed of the rotor is greater than the target rotor speed, decreasing power to the rotor by a fixed increment;
   (e) if the speed of the rotor is less than the target rotor speed, increasing power to the rotor by a fixed increment;
   (f) repeating steps (c), (d) and (e), until the speed of the rotor and the target rotor speed are within a predetermined margin,
   wherein the rotor is driven by a motor, and wherein power is provided to the rotor using pulse width modulation (PWM), and
   wherein the step of measuring the speed of the rotor comprises measuring the voltage a feedback voltage of the motor.

6. The method of claim 5, wherein the step of reading a throttle position comprises receiving a wireless command, wherein the wireless command specifies the throttle position.

7. A method of steering a toy helicopter, the helicopter having a first rotor and a second rotor, the method comprising the steps of:
   (a) reading a steering position;
   (b) measuring a first rotor speed;
   (c) determining a target second rotor speed based on the first rotor speed and the steering position;
   (d) measuring a second rotor speed;
   (e) if the second rotor speed is greater than the target second rotor speed, decreasing power to the second rotor by a fixed increment;
   (f) if the second rotor speed is less than the target second rotor speed, increasing power to the second rotor by a fixed increment;
   (g) repeating steps (d), (e) and (f), until the second rotor speed and the target second rotor speed are within a predetermined margin,
   wherein the first rotor is driven by a first motor, and the second rotor is driven by a second motor, and wherein power is provided to the first motor and the second motor using pulse width modulation (PWM),
   wherein the step of measuring the speed of the first rotor comprises measuring the a feedback voltage of the first motor, and
   wherein the step of measuring the speed of the second rotor comprises measuring the a feedback voltage of the second motor.

8. The method according to claim 7, wherein the step of determining the target second rotor speed comprises using a relationship associated with the steering position to compute the target second rotor speed from the first rotor speed.

9. The method according to claim 8 wherein the relationship is represented by a lookup table.

10. The method according to claim 8 wherein the relationship consists of multiplying the first rotor speed by a factor $\alpha$.

11. A toy helicopter comprising:
    a first rotor powered by a first motor;
    a second rotor powered by a second motor;
    a power source configured to provide power to the first rotor and the second rotor using pulse width modulation (PWM); and
    a microprocessor programmed with instructions for controlling the helicopter, the instructions comprising
    (a) measuring a speed of the first rotor;
    (b) determining a target second rotor speed based on the speed of the first rotor;
    (c) measuring a speed of the second rotor;
    (d) if the speed of the second rotor is greater than the target second rotor speed, decreasing power to the second rotor by a fixed increment;
    (e) if the speed of the second rotor is less than the target second rotor speed, increasing power to the second rotor by a fixed increment;
    (f) repeating steps (c), (d) and (e), until the speed of the second rotor and the target second rotor speed are within a predetermined margin,
       wherein the first rotor is driven by a first motor, and the second rotor is driven by a second motor, and wherein power is provided to the first motor and the second motor using pulse width modulation (PWM),
    wherein the step of measuring the speed of the first rotor comprises measuring the feedback voltage of the first motor, and
    wherein the step of measuring the speed of the second rotor comprises measuring the feedback voltage of the second motor.

12. A toy helicopter comprising:
    a first rotor powered by a first motor;
    a second rotor powered by a second motor;

a power source configured to provide power to the first rotor and the second rotor using pulse width modulation (PWM); and a microprocessor programmed with instructions for controlling the helicopter, the instructions comprising
(a) reading a throttle position;
(b) determining a target rotor speed based on the throttle position;
(c) measuring a speed of the rotor;
(d) if the speed of the rotor is greater than the target rotor speed, decreasing power to the rotor by a fixed increment;
(e) if the speed of the rotor is less than the target rotor speed, increasing power to the rotor by a fixed increment; and
(f) repeating steps (c), (d) and (e), until the speed of the rotor and the target rotor speed are within a predetermined margin,
wherein the rotor is driven by a motor, and wherein power is provided to the rotor using pulse width modulation (PWM),
wherein the step of measuring the speed of the rotor comprises measuring a speed of the first rotor or the second rotor;
wherein measuring the speed of the first rotor comprises measuring a feedback voltage of the first motor, and
wherein measuring the speed of the second rotor comprises measuring a feedback voltage of the second motor.

13. A toy helicopter comprising:
a first rotor powered by a first motor;
a second rotor powered by a second motor;
a power source configured to provide power to the first rotor and the second rotor; using pulse width modulation (PWM); and
a microprocessor programmed with instructions for steering a toy helicopter, the instructions comprising
(a) reading a steering position;
(b) measuring a first rotor speed;
(c) determining a target second rotor speed based on the first rotor speed and the steering position;
(d) measuring a second rotor speed;
(e) if the second rotor speed is greater than the target second rotor speed, decreasing power to the second rotor by a fixed increment;
(f) if the second rotor speed is less than the target second rotor speed, increasing power to the second rotor by a fixed increment; and
(g) repeating steps (d), (e) and (f), until the second rotor speed and the target second rotor speed are within a predetermined margin,
wherein the first rotor is driven by a first motor, and the second rotor is driven by a second motor, and wherein power is provided to the first motor and the second motor using pulse width modulation (PWM),
wherein the step of measuring the speed of the first rotor comprises measuring a feedback voltage of the first motor,
wherein the step of measuring the speed of the second rotor comprises measuring a feedback voltage of the second motor.

* * * * *